US012750411B2

(12) United States Patent
Tan

(10) Patent No.: US 12,750,411 B2
(45) Date of Patent: Sep. 29, 2026

(54) METHOD, ELECTRONIC DEVICE AND APPARATUS FOR TRANSMITTING MEDIA DATA STREAM, AND STORAGE MEDIUM

(71) Applicant: TENCENT TECHNOLOGY (SHENZHEN) COMPANY LIMITED, Shenzhen (CN)

(72) Inventor: Zhihua Tan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 67 days.

(21) Appl. No.: 18/908,254

(22) Filed: Oct. 7, 2024

(65) Prior Publication Data

US 2025/0030753 A1 Jan. 23, 2025

Related U.S. Application Data

(63) Continuation of application No. PCT/CN2023/127001, filed on Oct. 27, 2023.

(30) Foreign Application Priority Data

Nov. 15, 2022 (CN) ........................ 202211428364.0

(51) Int. Cl.
*H04L 65/65* (2022.01)
*H04N 21/6437* (2011.01)

(52) U.S. Cl.
CPC ......... *H04L 65/65* (2022.05); *H04N 21/6437* (2013.01)

(58) Field of Classification Search
CPC ............................ H04L 65/65; H04N 21/6437
USPC .......................................................... 709/231
See application file for complete search history.

(56) References Cited

U.S. PATENT DOCUMENTS

2014/0029477 A1* 1/2014 Suryavanshi ........... H04W 4/16 370/328
2018/0109388 A1* 4/2018 Gholmieh ................. H04L 9/14

FOREIGN PATENT DOCUMENTS

| | | | |
|---|---|---|---|
| CN | 102868937 | A | 1/2013 |
| CN | 104737515 | A | 6/2015 |
| CN | 112714335 | A | 4/2021 |
| KR | 20180050983 | A | 5/2018 |

OTHER PUBLICATIONS

The World Intellectual Property Organization (WIPO) International Search Report for PCT/CN2023/127001 Dec. 8, 2023 5 Pages (including translation).
Mark Handley et al., SDP: session description protocol. No. rfc4566. Jul. 2006. https://datatracker.ietf.org/doc/html/rfc4566.

(Continued)

*Primary Examiner* — Glenford J Madamba
(74) *Attorney, Agent, or Firm* — Anova Law Group, PLLC

(57) ABSTRACT

A method for transmitting a media data stream, performed in a server, is provided. The method includes obtaining a first data fragment from a first media data stream as an RTP load; obtaining a second data fragment from a second media data stream; adding the second data fragment into an RTP extension header; and generating an RTP packet comprising the RTP extension header and the RTP load.

20 Claims, 4 Drawing Sheets

(56) References Cited

OTHER PUBLICATIONS

Jonathan Rosenberg. Interactive connectivity establishment (ICE): A protocol for network address translator (NAT) traversal for offer/answer protocols. No. rfc5245. Apr. 2010. https://datatracker.ietf.org/doc/html/rfc5245.
Eric Rescorla et al., Datagram transport layer security version 1.2. No. rfc6347. Jan. 2012. https://datatracker.ietf.org/doc/html/rfc6347.
David Singer et al., A general mechanism for RTP Header Extensions. No. rfc8285. Oct. 2017. https://datatracker.ietf.org/doc/html/rfc8285.

* cited by examiner

METHOD, ELECTRONIC DEVICE AND APPARATUS FOR TRANSMITTING MEDIA DATA STREAM, AND STORAGE MEDIUM

CROSS-REFERENCES TO RELATED APPLICATIONS

This application is a continuation application of PCT Patent Application No. PCT/CN2023/127001, filed on Oct. 27, 2023, which claims priority to Chinese Patent Application No. 202211428364.0, filed on Nov. 15, 2022, all of which is incorporated herein by reference in their entirety.

FIELD OF THE TECHNOLOGY

The present disclosure relates to the field of data processing technologies and, more particularly, to method, apparatus, electronic device, and storage medium for transmitting media data stream.

BACKGROUND

Web real-time communication (WebRTC) is to introduce real-time communication, including audio and video calls and the like, into a web browser. The WebRTC implements a web page-based voice conversation or video call with a purpose of implementing a real-time communication capability on a web end without a plug-in.

The WebRTC mainly implements real-time audio and video communication based on a real-time transport protocol (RTP). A header of the RTP protocol may be extended to meet more requirements. However, the extension of the RTP header is mainly performed for some data frames of a data stream. When an extension data volume is large, it cannot be implemented through simple RTP header extension, but a new data stream needs to be added through WebRTC negotiation for transmitting data. This results in poor flexibility in dynamically increasing or decreasing a data stream.

SUMMARY

According to one embodiment of the present disclosure, a method for transmitting a media data stream, performed in a server, is provided. The method includes obtaining a first data fragment from a first media data stream as an RTP load; obtaining a second data fragment from a second media data stream; adding the second data fragment into an RTP extension header; and generating an RTP packet comprising the RTP extension header and the RTP load.

According to another embodiment of the present disclosure, a computer device is provided. The computer device includes one or more processors and a memory configured to store instructions that, when being executed, cause the one or more processors to perform: obtaining a first data fragment from a first media data stream as an RTP load; obtaining a second data fragment from a second media data stream; adding the second data fragment into an RTP extension header; and generating an RTP packet comprising the RTP extension header and the RTP load.

According to another embodiment of the present disclosure, a non-transitory computer-readable storage medium contains instructions that, when being executed, cause at least one processor to perform: obtaining a first data fragment from a first media data stream as an RTP load; obtaining a second data fragment from a second media data stream; adding the second data fragment into an RTP extension header; and generating an RTP packet comprising the RTP extension header and the RTP load.

BRIEF DESCRIPTION OF THE DRAWINGS

The accompanying drawings, which are incorporated herein and constitute a part of the specification, illustrate embodiments consistent with the present disclosure and are used to explain the principles of the present disclosure together with the specification. Apparently, the accompanying drawings in the following description are merely some embodiments of the present disclosure, and a person of ordinary skill in the art may further obtain other accompanying drawings according to the accompanying drawings without creative efforts.

DESCRIPTION OF EMBODIMENTS

Figure 1:
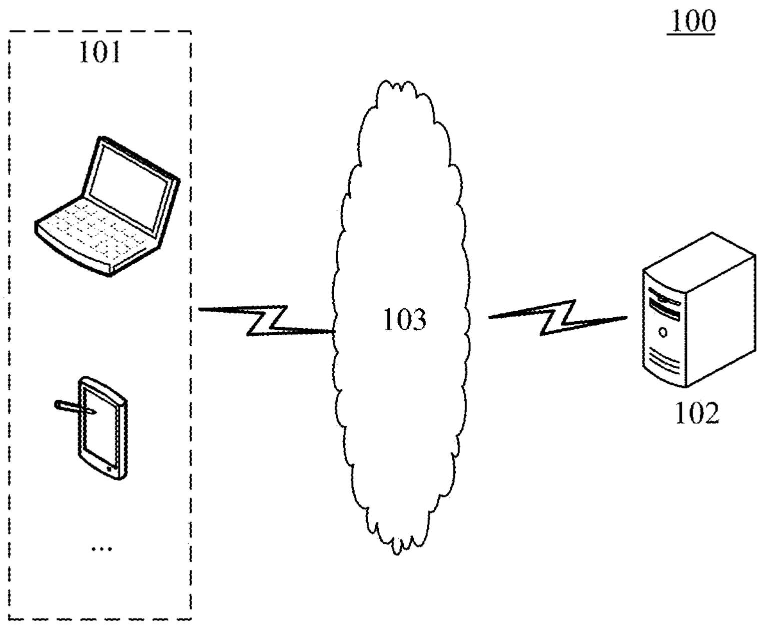
FIG. 1 shows a schematic structural diagram of an exemplary system architecture to which a method for transmitting a media data stream according to an embodiment of the present disclosure is applied.

Exemplary implementations will now be described more thoroughly with reference to the accompanying drawings. However, the exemplary implementations may be implemented in various forms, and are not to be understood as being limited to the examples described herein. Instead, the implementations are provided to make the present disclosure more thorough and complete and fully convey the idea of the exemplary implementations to a person skilled in the art.

In addition, the described features, structures, or characteristics may be combined in one or more embodiments in any appropriate manner. In the following description, a lot of specific details are provided to give a comprehensive understanding of the embodiments of the present disclosure. However, a person of ordinary skill in the art is to be aware that, the technical solutions in the present disclosure may be practiced without one or more of the specific details, or another method, unit, apparatus, or operation may be used. In other cases, well-known methods, apparatuses, implementations, or operations are not shown or described in detail, in order not to obscure the aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary description, do not need to include all content and operations, and do not need to be performed in the described orders either. For example, some operations may be further divided, while some operations may be combined or partially combined. Therefore, an actual execution order may change according to an actual case.

Various embodiments provide method, apparatus, electronic device, and storage medium for transmitting a media data stream. In one embodiment, one RTP stream can be multiplexed, and two media data streams are transmitted through an RTP packet of the same RTP stream, which avoids adding a plurality of SDP negotiation when a media data stream needs to be added, thereby improving transmission efficiency and transmission convenience of the media data stream.

Before detailed descriptions of various embodiments of the present disclosure, related technical terms are explained as follows.

1. Web real-time communication (WebRTC) is a standard for W3C and IETF, and is applied to real-time audio and video communication.
2. Real-time transport protocol (RTP) is a network transport protocol, and is published in RFC 1889 by a multimedia transport group of IETF in 1996.
3. SDP is a session description protocol.
4. DTLS is a datagram transport layer security protocol.
5. User datagram protocol (UDP) is a connectionless transport layer protocol that provides a transaction-oriented simple and unreliable information transmission service.

In general, during real-time audio and video communication based on WebRTC, a real-time transport protocol RTP protocol is usually used to be responsible for packetization and transmission of audio and video data. However, during the packetization and transmission of the audio and video data by using the RTP protocol, only one media data stream can be packetized and transmitted. Although a header of the RTP protocol may be extended and may be used to extend the media data stream, the RTP extension header can only extend some data frames, and the data volume is small. Each data frame is a data frame corresponding to the media data stream itself, and data with a large data volume cannot be extended. For example, if the transmitted media data stream is a video stream, the extended data is extension information corresponding to the video stream, and data such as a subtitle stream, interactive text, and background music that needs to be displayed synchronously with the video stream cannot be extended through the RTP extension header.

If a large amount of newly added data needs to be transmitted, a new data stream needs to be added by using WebRTC negotiation to transmit the data. In other words, for different media data streams to be transmitted, a negotiation process (that is, SDP negotiation) of a corresponding rule needs to be performed first based on a session description protocol (SDP), and one more media data stream m=<media><port><proto><fmt list> needs to be defined. In addition, many fields corresponding to the media data stream need to be defined, and data is then encapsulated and transmitted based on the RTP protocol. However, such a method for transmitting a media data stream has complicated operations, a large delay, a poor synchronization effect, and poor user experience, and has a poor flexibility in dynamically increasing or decreasing one data stream. Therefore, the related art can no longer be applicable to scenarios such as live streaming, video conferencing, and P2P that require high synchronization of media data streams. In addition, many types of data streams cannot be synchronized. For example, an extension interactive supplementary data stream of the audio and video stream itself or metadata stream cannot be synchronized.

An embodiment of the present disclosure provides a method for transmitting a media data stream. The method for transmitting a media data stream in the present disclosure may be applied to any live streaming and audio/video call scenarios, such as a video conference, a video call, interactive live streaming, e-commerce live streaming, and the like. In addition, when synchronization is implemented, there is no need to redefine a new media data stream and many related fields. An independent media data stream can be constructed based on an existing RTP stream, so that two media data streams can be transmitted simultaneously in one RTP stream.

FIG. 1 is a block diagram of an exemplary system architecture applying the technical solution of the present disclosure.

As shown in FIG. 1, a system architecture 100 may include a terminal device 101, a server 102, and a network 103. The terminal device 101 may be various electronic devices such as a smartphone, a tablet computer, a notebook computer, a desktop computer, a smart television, or a smart vehicle-mounted terminal that have a display screen or have a display screen and a voice playback device. The terminal device 101 may be configured to receive two media data streams that are simultaneously transmitted through the same RTP packet, where the two media data streams may both be video data, or may both be audio data, or may both be subtitle stream data, or may be any two of the video data, the audio data, and the subtitle stream data. When the two media data streams are both the video data or the subtitle stream data, the terminal device 101 may render and display the two media data streams on the display screen. When the two media data streams are both the audio data, the two media data streams may be played through the voice playback device. When the two media data stream are any two of the video data, the audio data, and the subtitle stream data, the video data or the subtitle stream data may be rendered and displayed on the display screen while audio information is played through the voice playback device. The server 102 may be an independent physical server, or may be a server cluster including a plurality of physical servers or a distributed system, or may be a cloud server that provides cloud computing services. The server 102 may include electronic device(s). The network 103 may be a communication medium of various connection types that can provide a communication link between the terminal device 101 and the server 102, For example, the communication link may be a wired communication link or a wireless communication link.

According to implementation requirements, the system architecture in the embodiments of the present disclosure may have any number of terminal devices, networks, and servers. For example, the server may be a server cluster including a plurality of server devices. In addition, the technical solutions provided in the embodiments of the present disclosure may be applied to the terminal device 101.

In an embodiment of the present disclosure, the terminal device 101 first performs SDP negotiation with the server 102, to ensure that underlying code supports a function required by an application layer, and then transmits a media data stream between the terminal device 101 and the server 102. During transmission of the media data stream, an RTP packet including a first data fragment of an original media data stream and a second data fragment of an extended media data stream may be generated based on the RTP protocol. The RTP packet is then encapsulated by using a preset transport protocol (such as a UDP) to form a target packet. The target packet is sent to the terminal device 101 through the network 103, so that the terminal device 101 obtains the RTP packet by parsing the target packet, obtains the first data fragment of the original media data stream and the second data fragment of the extended media data stream by parsing the RTP packet, then obtains two different media data streams by decoding the first data fragment and the second data fragment, and performs rendering and synchronous presentation according to the original media data stream and the extended media data stream. In the embodiments of the present disclosure, header extension may be performed on the RTP protocol and a field is customized to implement RTP stream multiplexing. In this way, an independent media data stream may further be constructed based on one media data stream, so that simultaneous transmission of the two media data streams through one RTP stream is implemented, SDP negotiation does not need to be performed again for the newly added media data stream, and the transmission is compatible with the WebRTC standard.

In an embodiment of the present disclosure, according to different application scenarios, the system architecture may differ. For example, in a P2P scenario, there may be a plurality of terminal devices, but no server exists. In other words, the terminal device is both a terminal and a server. Although the system architecture differs, manners of synchronously transmitting two media data streams by using the stream multiplexing method of performing header extension on the RTP protocol are the same.

In an embodiment of the present disclosure, the server 102 in the present disclosure may be a cloud server that provides a cloud computing service. In other words, the present disclosure relates to cloud storage and cloud computing technologies.

Cloud storage is a new concept that is extended and developed on the concept of cloud computing. A distributed cloud storage system (hereinafter referred to as a storage system) refers to a storage system that collects, through functions such as cluster application, a grid technology, and a distributed storage file system, a large number of different types of storage devices (the storage devices are also referred to as storage nodes) in a network to work in cooperation through application software or an application interface, and jointly provide data storage and service access functions to the outside.

Currently, a storage method of a storage system is to create a logical volume. When the logical volume is created, a physical storage space is allocated to each logical volume, where the physical storage space may be formed by a disk of a storage device or disks of several storage devices. A client stores data on a logical volume, that is, stores data on a file system. The file system divides the data into many parts, and each part is an object. The object includes not only the data but also additional information such as a data identifier (ID). The file system writes each object into the physical storage space of the logical volume, and the file system records storage position information of each object. Therefore, when the client requests to access the data, the file system can enable the client to access the data based on the storage position information of each object.

A process of the storage system allocating the physical storage space to the logical volume is specifically: dividing the physical storage space into stripes in advance according to capacity estimation (the estimation usually has a large margin compared with a capacity of an object to be actually stored) of an object stored in the logical volumes and a group of a redundant array of independent disk (RAID). One logical volume may be understood as one strip, so that the physical storage space is allocated to the logical volume.

Cloud computing is a computing mode that distributes a computing task on a resource pool formed by a large number of computers, so that various application systems can obtain computing power, storage space, and information services according to a requirement. A network that provides resources is called a “cloud”. Resources in the “cloud” may be infinitely expanded for a user, and can be obtained at any time, used on demand, expanded readily, and paid for use.

As a provider of basic capabilities of cloud computing, a cloud computing resource pool (a cloud platform for short, generally referred to as infrastructure as a service (IaaS)) is established. A plurality of types of virtual resources are deployed in the resource pool for an external customer to choose and use. The cloud computing resource pool mainly includes a computing device (which is a virtualization machine, and includes an operating system), a storage device, and a network device.

According to logical function division, a platform as a service (PaaS) layer may be deployed on an IaaS layer, and a software as a service (SaaS) layer may be deployed on the PaaS layer, or the SaaS may be directly deployed on the laaS. The PaaS is a platform on which software runs, such as a database or a web container. The SaaS is a variety of service software, such as a web portal or a short message bulk sender. Generally, the SaaS and the PaaS are upper layers relative to the IaaS.

Technical solutions such as a method for transmitting a media data stream, a media data stream synchronization apparatus, a computer-readable medium, and an electronic device provided in the present disclosure are described in detail below with reference to specific implementations.

Figure 2:
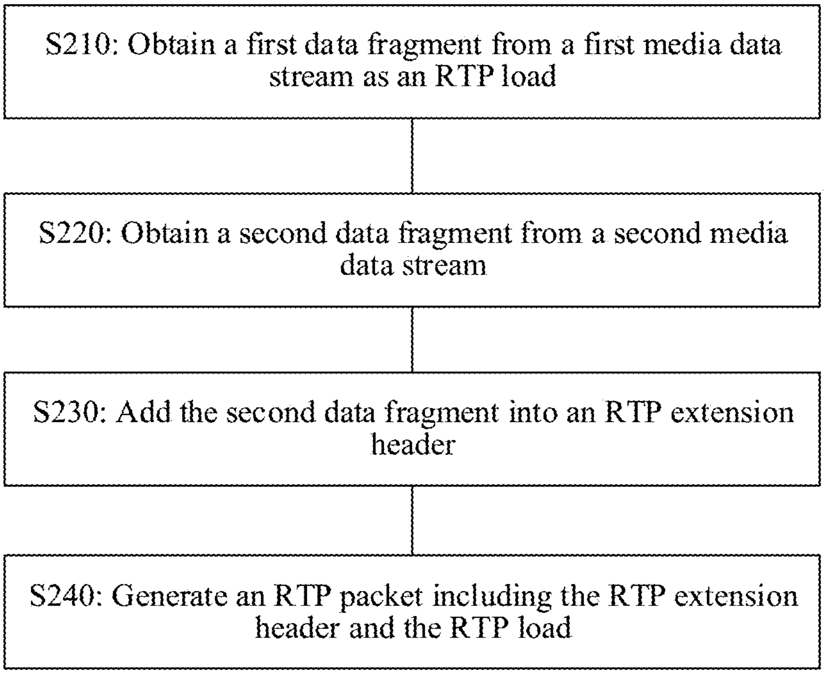
FIG. 2 shows a schematic flowchart of operations of an exemplary method for transmitting a media data stream according to an embodiment of the present disclosure.

FIG. 2 is a flowchart of a method for transmitting a media data stream according to an embodiment of the present disclosure, where the method for transmitting a media data stream may be, for example, implemented by a server. For example, the server may be the server 102 shown in FIG. 1. As shown in FIG. 2, a method 200 for transmitting a media data stream according to this embodiment of the present disclosure may mainly include the following Operation S210 to Operation S240.

Operation S210: Obtain a first data fragment from a first media data stream as an RTP load. The first media data stream refers to a media data stream transmitted by an RTP load of an RTP stream (that is, a sequence including a plurality of RTP packets), and may also be referred to as an original media data stream. One first data fragment is one fragment of the first media data stream.

Operation S220: Obtain a second data fragment from a second media data stream. The second media data stream may also be referred to as an extended media data stream.

Operation S230: Add the second data fragment into an RTP extension header. One second data fragment is one fragment of the second media data stream.

Operation S240: Generate an RTP packet including the RTP extension header and the RTP load. Herein, the RTP packet generated according to the method 200 may be configured for simultaneously transmitting two media data streams.

On one hand, one RTP stream can be multiplexed in the present disclosure, two different media data streams are carried in the same RTP stream, which avoids creating a media data stream protocol stack separately for different media data streams (that is, creates one RTP stream separately), and avoids performing session description protocol (SDP)-based SDP negotiation separately for different media data streams, thereby simplifying a transmission operation of the media data stream and improving transmission efficiency and transmission convenience of the media data stream. On the other hand, the method for transmitting a media data stream in the embodiments of the present disclosure only needs to perform RTP header extension customization at an RTP service sending layer and perform corresponding parsing and assembly at an RTP service receiving layer, so that synchronous transmission of a dynamic data stream can be implemented, the transmission is compatible with the WebRTC standard, and a media data stream can be dynamically and flexibly added. In addition, one first data fragment and one second data fragment are transmitted in the same RTP packet, so that the two data fragments can be transmitted synchronously, thereby achieving transmission synchronization of two media data streams, and avoiding asynchronization between different media data streams.

In an embodiment, in Operation S210, the first media data stream may be fragmented to obtain a plurality of fragments, where each fragment is used as one first data fragment. In Operation S210, for each first data fragment, a data fragment with a collection period the same as a collection period of the first data fragment may be obtained from the second media data stream as a second data fragment. In an embodiment, in Operation S210, for each first data fragment, a data fragment with a display period the same as a display period of the first data fragment may be obtained from the second media data stream as a second data fragment. In this way, in the embodiments of the present disclosure, two types of data fragments that are time-aligned (that is, the collection periods or the display periods are the same) may be transmitted in the same RTP packet.

In an embodiment of the present disclosure, a first media data stream that needs to be obtained from a media device or an address corresponding to a unified resource identifier is defined as the original media data stream; and a second media data stream that needs to be displayed synchronously with the original media data stream is defined as the extended media data stream. For example, during live streaming, a data stream corresponding to a video recorded in a process of live streaming performed by a livestreamer is the original media data stream, and during the live streaming, a data stream corresponding to a media object such as a picture and a subtitle that are displayed in a live streaming picture and background music played is the extended media data stream. In another example, a data stream corresponding to content such as text information and a picture sent during interaction between a viewer and the livestreamer is the extended media data stream. In the embodiments of the present disclosure, according to different scenarios, a type of the extended media data stream may also differ. For example, when the scenario is an interactive live streaming scenario, the extended media data stream may include an interactive subtitle and the like. When the scenario is an e-commerce live streaming scenario, the extended media data stream may include a subtitle, a picture, and the like. When the scenario is a video chat, the extended media data stream may include audio, a picture, and the like. Certainly, the extended media data stream may alternatively be an object of another type. This is not specifically limited in the embodiments of the present disclosure.

In an embodiment of the present disclosure, the media data stream is transmitted in a form of a packet. Therefore, when the media data stream is to be transmitted, the media data stream needs to be packetized (which may also be referred to as grouped or fragmented), to form corresponding data fragments sequentially. Correspondingly, in the embodiments of the present disclosure, to implement synchronous transmission of the extended media data stream, the obtained extended media data stream needs to be packetized to obtain a plurality of second data segments corresponding to the extended media data stream. In addition, the original media data stream also needs to be obtained while the extended media data stream is obtained, and the original media data stream is packetized to form a plurality of corresponding first data fragments.

In an embodiment of the present disclosure, to achieve synchronous transmission of the original media data stream and the extended media data stream through RTP stream multiplexing, and to synchronously display objects corresponding to the original media data stream and the extended media data stream on a display screen of the terminal device, when the second data fragment is generated, the extended media data stream needs to be aligned first according to a time correspondence (for example, a correspondence about a sampling time or a display time) between the original media data stream and the extended media data stream, and then the extended media data stream is packetized to form the plurality of second data fragments. In the embodiments of the present disclosure, the original media data stream and the extended media data stream are independent of each other, and the original media data stream and the extended media data stream are also independent of each other and do not affect each other when the original media data stream and the extended media data stream are packetized. In addition, since the extended media data stream is aligned according to the time correspondence between the extended media data stream and the original media data stream, and the extended media data stream and the original media data stream are sent to the terminal device through the same RTP stream, the terminal device can synchronously obtain the first data fragment and the second data fragment that are time-aligned, and perform rendering and synchronous presentation according to the first data fragment and the second data fragment.

Figure 3:
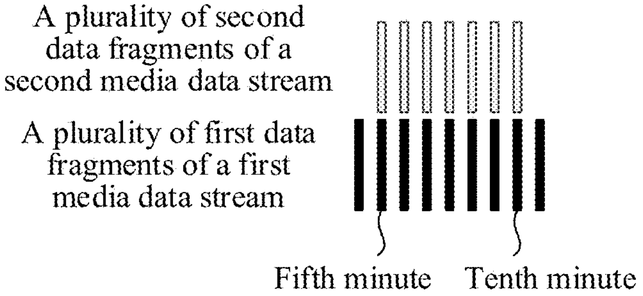
FIG. 3 shows a schematic structural diagram of inserting an extended media data stream into the original media data stream according to an embodiment of the present disclosure.

FIG. 3 shows a schematic diagram of an interface of aligning, according to a time correspondence between a first media data stream and a second media data stream in a live streaming scenario, first data fragments of the first media data stream and second data fragments of the second media data stream. As shown in FIG. 3, during live streaming, a live streaming data stream is the first media data stream. When the livestreamer broadcasts to the fifth minutes, background music starts to be inserted, where the background music is the extended media data stream, and playback of the background music ends until the end of the tenth minute. When the first data fragments and the second data fragments are transmitted, a first data fragment where an image frame at the fifth minute in the live streaming video of the livestreamer is located may be aligned with a second data fragment where a start frame of the background music is located, and a first data fragment corresponding to an image frame at the tenth minute in the live streaming video of the livestreamer is aligned with a second data fragment where an end frame of the background music is located. In this way, the terminal device can simultaneously obtain the first data fragments corresponding to the live streaming video of the livestreamer and the second data fragments corresponding to the background music, and can also synchronously play the background music while displaying pictures in the fifth minute to the tenth minute of the live streaming video, to achieve synchronous transmission and synchronous presentation of the first media data stream and the second media data stream.

In an embodiment of the present disclosure, the second media data stream is a dynamic data stream and also a customized data stream. The second media data stream is independent of the first media data stream and may be directly added to the RTP extension header. In the embodiments of the present disclosure, the second media data stream is a media data stream with strong correlation with the first media data stream. Specifically, the second media data stream may be a synchronous sub-stream or an interactive sub-stream of the first media data stream. The synchronous sub-stream is a media data stream of the same producer as the first media data stream. For example, if an audio producer adds a background sound to audio, the audio is the first media data stream, and the background sound is the synchronous sub-stream. The interactive sub-stream is a media data stream that has a different producer from that of the first media data stream. For example, during interactive live streaming, a media data stream generated in the live streaming performed by the livestreamer is the first media data stream, and audio, a subtitle stream, or the like generated by an interactor during interaction is the interactive sub-stream. Certainly, there are some other types of synchronous sub-streams and interactive sub-streams. Details are not described in the embodiments of the present disclosure.

In an embodiment of the present disclosure, before the first data fragment and the second data fragment are obtained, a communication connection between the terminal device and the server needs to be established, and a parameter and a rule during media data stream transmission are negotiated, to ensure function support required for data transmission at the application layer by underlying code. In the embodiments of the present disclosure, negotiation is implemented based on the session description protocol (SDP), and is implemented through offer/answer by the terminal device and the server. Specifically, the terminal device sends an SDP offer to the server through the network. After receiving the offer, the server determines whether to accept or reject. After the server determines to accept the offer, the server sends an answer to the terminal device through the network. After the server determines to reject the offer, the server sends a rejection to the terminal device through the network. Considering that to implement transmission of the media data stream, it is necessary for the server to accept the offer sent by the terminal device, a case that the server rejects the offer is not considered in the embodiments of the present disclosure. After sending the answer to the terminal device, the server confirms the function support related in the SDP offer. Further, the media data stream may be transmitted based on the RTP protocol.

In an embodiment of the present disclosure, SDP negotiation mainly negotiates specific information of the media data stream. When an extension header exists in an RTP, the RTP extension header is further negotiated. Next, specific content of SDP negotiation is described through an example.

A description of the first media data stream in the RTP offer is:

m=<media><port><proto><fmt list>

<media> is a media type, such as audio or a video;

<port> is a port;

<proto> is a transport protocol, such as the UDP/RTP, representing that the UDP is used to transmit the RTP packet; and <fmt list> is a media format and a data load type list.

A description of the RTP extension header by the SDP layer is:

a=extmap:<value>["/"<direction>]<URI><extension attributes> value represents an extension header identifier;

direction represents a transmission direction, and may be sendonly, recvonly, sendrecv; or inactive, where a default value is sendrecv;

URI represents a URI of the extension header, and two communication parties can indicate, by using the URI, meanings of the extension header to enable both parties to understand; and extension attributes represent other media data stream information, such as a complex description of a stream identifier.

In an embodiment of the present disclosure, during SDP negotiation, parameters such as the extension header identifier and the URI corresponding to the second media data stream may be described by using the SDP offer. In this way, it can be ensured that functions used in a subsequent transmission process of the second media data stream can all be supported by the underlying code. In addition, when an independent second media data stream is subsequently added based on an existing first media data stream, there is no need to perform SDP negotiation for the newly added second media data stream. In other words, in the present disclosure, SDP negotiation only needs to be performed once, to implement synchronous transmission of two independent media data streams based on RTP stream multiplexing.

In an embodiment, the method 200 may include: receiving an offer generated based on the session description protocol (SDP) and sent by the terminal device. The offer includes media description and extension information. The media description is configured for representing description information related to transmission of the first media data stream, where the description information may include a parameter of function support related to transmission of the media data stream. For example, the foregoing mentioned m=<media><port><proto><fmt list> is included. The extension information is configured for representing description information related to transmission of the second media data stream in the RTP extension header, and includes, for example, the extension header identifier and the URI configured for transmitting the second media data stream. For example, the extension information may include extmap: value>["/"<direction>]<URI><extension attributes>.

In addition, the method 200 includes: generating an answer to the offer. The answer may include, for example, an indication related to receiving the SDP offer by the server. For example, the answer may be confirmation of the function support related in the SDP offer.

The method 200 may further include: transmitting the answer to the terminal device, to complete SDP negotiation with the terminal device.

In an embodiment of the present disclosure, after SDP negotiation is completed and the first data fragment and the second data fragment are obtained, an RTP packet may be generated based on the first data fragment and the second data fragment, and the RTP packet is sent to the terminal device. Generally, one RTP stream can transmit only one media data stream (that is, one RTP packet in one RTP stream can transmit only data fragments of one media data stream). To achieve RTP streams multiplexing and a function of transmitting two media data streams simultaneously, the RTP header is extended in the present disclosure, and the RTP extension header in one RTP stream is used to transmit data fragments of one media data stream.

Figure 4:
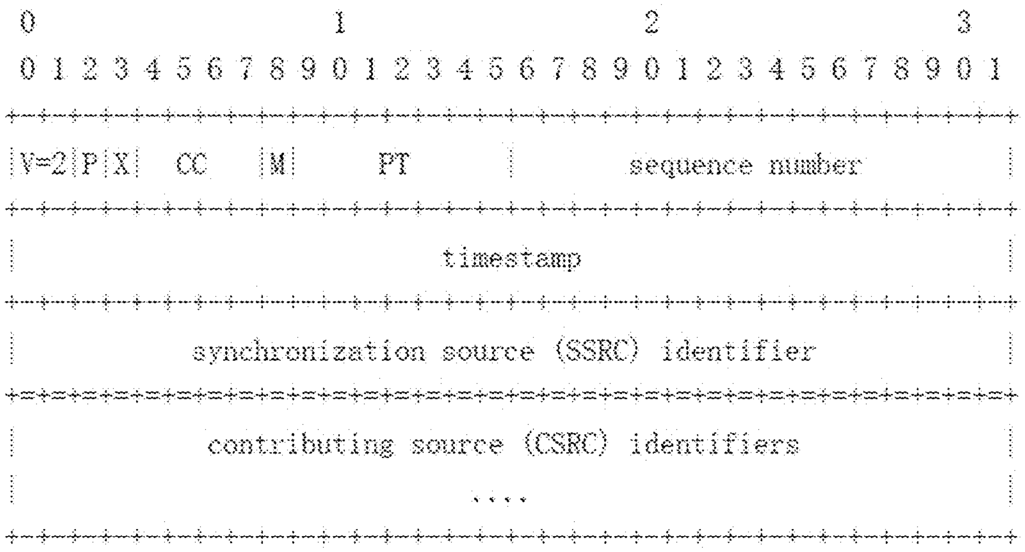
FIG. 4 shows a schematic structural diagram of a fixed header of a real-time transport protocol RTP protocol according to an embodiment of the present disclosure.

A header of an RTP packet (that is, an RTP message) includes a fixed header and an extension header. FIG. 4 shows a schematic structural diagram of a fixed header of an RTP packet. As shown in FIG. 4, the fixed header includes a plurality of flag bits. V represents a version number of the RTP protocol, which occupies 2 bits, and a current protocol version number is 2. P is a padding flag bit and occupies 1 bit, if P=1, one or more additional octets are padded at a tail of the RTP packet, and the one or more additional octets are not part of a payload. X is an extension flag and occupies 1 bit, if X=1, there is an extension header following the RTP header. CC is a CSRC counter and occupies 4 bits, which indicates a quantity of CSRC identifiers. M is a mark bit and occupies 1 bit, and different payloads have different meanings, where for a video, M marks an end of a frame, and for audio, M marks a start of a session. PT is a payload type and occupies 7 bits, the payload type is configured for indicating a type of a payload in the RTP packet, such as GSM audio or a JPEM image, and tn streaming media, the payload type is mostly used to distinguish an audio stream from a video stream, which facilitates parsing by a terminal device. Sequence number occupies 16 bits, and is used to identify a sequence number of an RTP packet sent by a sender. Each time a message is sent, the sequence number is incremented by 1. The field may be used to check for packet loss when a network status is poor when UDP is used as a lower-layer bearer protocol, and may be used to reorder data when a network jitter occurs. An initial value of the sequence number is random, and sequences of an audio packet and a video packet are counted separately. Timestamp occupies 32 bits, and a 90 KHZ clock frequency (90000 in the program) has to be used. The timestamp reflects a sampling moment of a first octet of the RTP packet. A recipient calculates a delay and a delay jitter by using the timestamp and performs synchronization control. A time sequence of the packet may be obtained based on the timestamp of the RTP packet. Synchronization source (SSRC) identifier occupies 32 bits and is configured for identifying a synchronization source. The synchronization source refers to a source that generates a media stream and is identified by a 32-bit digital SSRC identifier in an RTP packet instead of relying on a network address. A recipient distinguishes different sources according to the SSRC identifier to group RTP packets. Each contributing source (CSRC) identifier occupies 32 bits, and there may be 0 to 15 CSRSs, where each CSRC identifier includes all contributing sources included in the payload of the RTP packet.

Figure 5A:
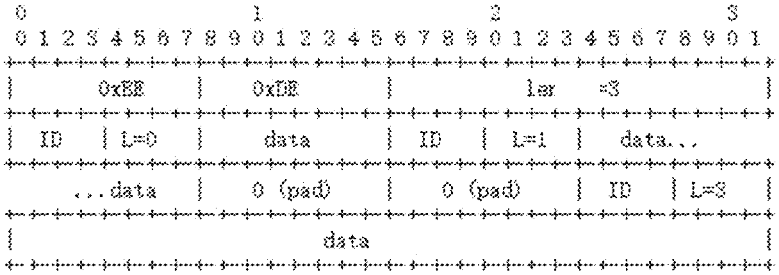
FIG. 5A shows a schematic structural diagram of a one-byte header of a real-time transport protocol RTP protocol according to an embodiment of the present disclosure.
Figure 5B:
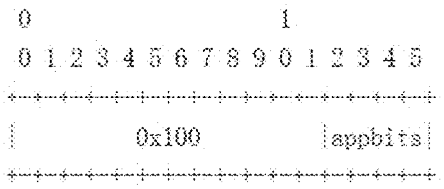
FIG. 5B shows a schematic structural diagram of a two-byte header of a real-time transport protocol RTP protocol according to an embodiment of the present disclosure.

When the extension flag bit X=1, there is an extension header following the RTP header, where the extension header may be configured for transmitting some other necessary information. There are two manners of extending the extension header, where one is one-byte header extension, and the other is two-byte header extension. FIG. 5A shows a schematic structural diagram of a one-byte header. As shown in FIG. 5A, the one-byte header includes an extension flag 0XBEDE, a total length of the extension header, and an extension header identifier ID, a load length L, and load data of a plurality of extension headers corresponding to the total length of the extension header. FIG. 5B shows a schematic structural diagram of a two-byte header. As shown in FIG. 5B, the two-byte header includes an extension flag 0x100 and an appbits field. Further, the two-byte header may further include a total data length of the extension header, and an extension header element identifier ID, a load length L, and load data of a plurality of extension headers corresponding to the total data length of the extension header.

By analyzing the structures of the one-byte header and the two-byte header shown in FIG. 5A and FIG. 5B, it can be found that header formats and data lengths of the two extension manners are different. Since an objective of the present disclosure is that an RTP packet can independently carry an extended media data stream while carrying an original media data stream, a function parameter field required by the extended media data stream in a transmission process needs to be customized. There is no field that can be customized in the one-byte header, and the appbits field in the two-byte header depends on an application program, which may be defined as any value or meaning, and may be configured for padding data at an application level, where the data at the application level is not supported by a standard. In the embodiments of the present disclosure, data to be padded may be customized. Generally, for signaling purposes, the appbits field is considered as a special extension value allocated to a local identifier 256. If extension is not specified for the local identifier 256 by configuration or signaling, a sender shall set the appbits field to all 0, and a recipient has to ignore the field. However, in the embodiments of the present disclosure, in order to implement RTP media data stream multiplexing, the appbits field in the two-byte header needs to be customized, to enable the underlying code implement function support to an extended media data stream added to the RTP packet.

In an embodiment of the present disclosure, the first data fragment may be padded into the RTP message as an RTP load, and the second data fragment may be padded into an RTP extension header. An RTP packet carrying the first data fragment of the original media data stream and the second data fragment of the extended media data stream is further generated according to the padded RTP extension header and the RTP load carrying the original media data stream. Based on this, the RTP packet may be sent to the terminal device, so that the terminal device can perform rendering and synchronous presentation according to the original media data stream and the extended media data stream by receiving RTP packets. Each RTP packet includes a header and an RTP load, where the header includes an RTP fixed header and an RTP extension header.

In an embodiment of the present disclosure, after receiving a plurality of RTP packets, the terminal device needs to extract second data fragments from the RTP packets to obtain a complete second media data stream. To determine a start fragment (that is, a first second data fragment of the second media data stream) and an end fragment (that is, a last second data fragment of the second media data stream) of the second media data stream in a collection order (or a display order), in the embodiments of the present disclosure, the start fragment and the end fragment may be marked separately.

In an embodiment, when the second data fragment in an RTP packet is the start fragment of the second media data stream, a start field representing that the second data fragment is the start fragment is set in the RTP extension header of the RTP packet. When the second data fragment is the end fragment of the second media data stream, an end field representing that the second data fragment is the end fragment is set in the RTP extension header. For example, the appbits field in the RTP extension header is configured for representing a position of the second data fragment in the second media data stream. Herein, a value range of the position of the second data fragment includes a position of the start fragment, a position of the end fragment, and a position between the start fragment and the end fragment. For example, the appbits field includes 4 bits. Setting the appbits field in the RTP extension header to the start field includes: setting a first bit of the appbits field to 1 and setting remaining bits to 0. That is, the appbits field is set to 1000. In addition, setting the appbits field in the RTP extension header to the end field includes: setting a second bit of the appbits field to 1 and setting remaining bits to 0. That is, the appbits field is set to 0100. In addition, when one second data fragment is between the start fragment and the end fragment, the appbits field in the RTP extension header carrying the second data fragment is set to 0000.

In some embodiments, data in the RTP packet may be extracted and assembled to obtain the extended media data stream. For example, according to the start field and the end field, the start fragment and the end fragment are determined. The start fragment, the end fragment, and second data fragments between the start fragment and the end fragment may form a complete extended media data stream.

Figure 6:
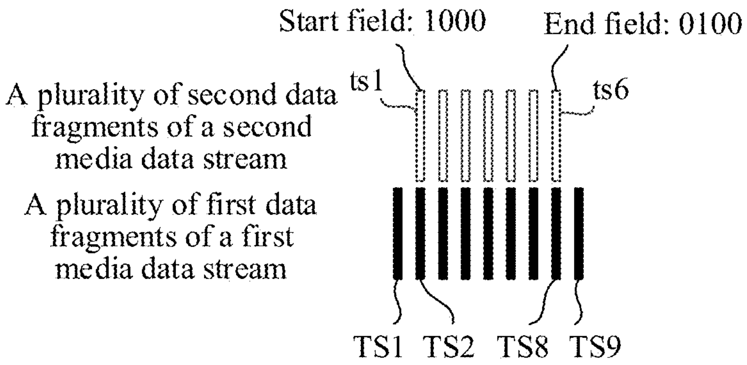
FIG. 6 shows a schematic diagram of a first media data stream and a second media data stream.

FIG. 6 is a schematic diagram of a first media data stream and a second media data stream. As shown in FIG. 6, the extended media data stream is fragmented into a plurality of fragments. The plurality of fragments includes a start fragment ts1 and an end fragment ts6, the start fragment ts1 is marked with a start field 1000, and the end fragment ts6 is marked with an end field 0100. In other words, all fragments in the start fragment ts1 to the end fragment ts6 form a complete second media data stream. The original media data stream is also fragmented into a plurality of fragments, for example, fragments TS1 to TS9. The fragment TS1 is a first data fragment in the original media data stream. The start fragment ts1 is aligned with the fragment TS2. Therefore, the start fragment ts1 and the fragment TS2 may be transmitted by the same RTP packet. Similarly, the end fragment ts6 and the fragment TS8 may be transmitted by the same RTP packet.

In some embodiments, after the terminal device or the server completes defining the start field and the end field of the extended media data stream in the appbits field, in a process in which the server obtains the extended media data stream and fragments the extended media data stream, the second data fragments forming the extended media data stream may be marked according to a custom rule of the appbits field. Specifically, when encoding the extended media data stream, the server may first fragment the extended media data stream. During fragmentation, one frame object (audio, an image, or the like) may be encoded into one or more second data fragments. In a process of generating the RTP packet, different second data fragments may be marked. Since second data fragments in the second media data stream are arranged in sequence, during generation of the RTP packet, only the start fragment and the end fragment may be marked. A specific marking method is marking in the appbits field. The marking rule in the foregoing embodiment is taken as an example. When the extended media data stream starts, the appbits field in the RTP extension header containing the start fragment is set as the start field, that is, the first bit of the appbits field is marked as 1 and the remaining bits are marked as 0. When the extended media data stream ends, the appbits field in the RTP extension header containing the end fragment is set as the end field, that is, the second bit of the appbits field is marked as 1 and the remaining bits are marked as 0. For any second data fragment between the start field and the end field contained in the second media data stream, the appbits field in the RTP extension header containing the second data fragment may be set to 0000. In this way, the terminal device may determine a start of the second media data stream when parsing out the start field from an RTP extension header; and determine an end of the second media data stream when parsing out the end field from an RTP extension header.

In an embodiment of the present disclosure, a size of a header of the RTP packet and a size of the RTP packet are limited. For example, the size of the header of the RTP packet does not exceed 255 bytes, and a total size of the RTP packet does not exceed 1200 bytes. Therefore, to carry the second data fragments corresponding to the extended media data stream through the RTP extension header, a fragment size of the extended media data stream needs to be set according to an extension size of the header of the RTP packet, and then the second media data stream is fragmented and transmitted according to the fragment size.

In an embodiment of the present disclosure, when the RTP packet is generated, the RTP packet may be sent to the terminal device, so that the terminal device synchronously presents the original media data stream and the extended media data stream. After the RTP packet is generated, the RTP packet may be encapsulated according to a preset transport protocol (such as a UDP) to generate a target packet (such as a UDP packet) corresponding to the preset transport protocol, and then the target packet is sent to the terminal device, so that the terminal device obtains required data from the target packet. The preset transport protocol may be specifically a UDP protocol. UDP is a connectionless transport layer protocol. Although providing a transaction-oriented simple and unreliable information transmission service, the UDP protocol can improve timeliness of data transmission, reduce a delay, and improve user experience. Therefore, the UDP protocol is usually used as the preset transport protocol, and certainly another transport protocol may be used. This is not specifically limited in the embodiments of the present disclosure.

Figure 7:
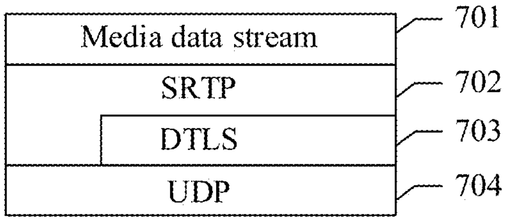
FIG. 7 shows a schematic structural diagram of an underlying protocol stack of a WebRTC media data stream according to an embodiment of the present disclosure.

FIG. 7 shows a schematic structural diagram of an underlying stack of a WebRTC media data stream. As shown in FIG. 7, the underlying stack of the WebRTC media data stream successively includes, from top to bottom, a media data stream layer 701, an SRTP layer 702, a DTLS layer 703, and a UDP layer 704. The SRTP layer 702 is located in a transmission layer and mainly processes a media data stream in the media data stream layer 701 to generate an RTP packet. The DTLS layer 703 is a packet transport layer security protocol layer, and is configured to ensure security during transmission of the RTP packet and ensure that the RTP packet is transmitted through an encrypted channel. The UDP layer 704 is at the transmission layer. After the RTP packet reaches the UDP layer, the RTP packet further needs to be encapsulated according to the UDP protocol to form a UDP packet including the RTP packet. Then the UDP packet is sent to the terminal device, so that the terminal device parses the UDP packet to obtain the RTP packet, parses the RTP packet to obtain the first data fragment corresponding to the original media data stream and the second data fragment corresponding to the extended media data stream, and obtains the required original media data stream and extended media data stream by obtaining the plurality of first data fragments and the plurality of second data fragments.

Figure 8:
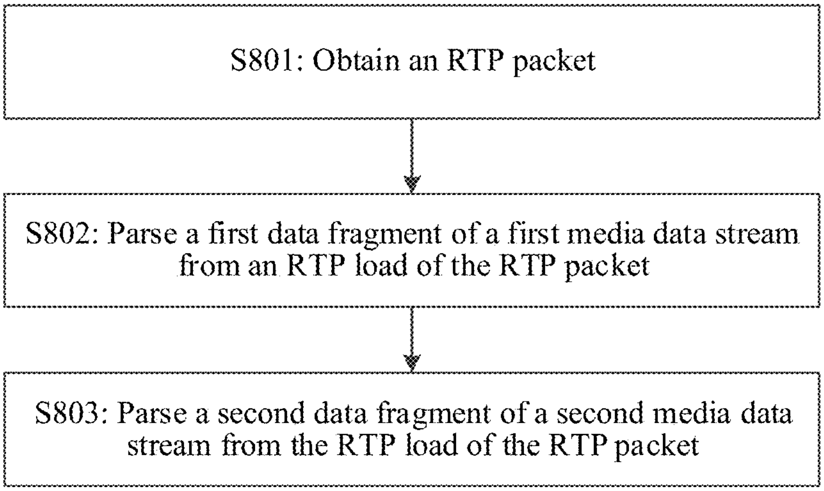
FIG. 8 shows a schematic flowchart of an exemplary method for transmitting a media data stream according to an embodiment of the present disclosure.

FIG. 8 shows a schematic flowchart of a method 800 for transmitting a media data stream. The method 800 is performed in the terminal device.

As shown in FIG. 8, in Operation S801, an RTP packet is obtained. The RTP packet includes an RTP load and an RTP extension header. The RTP load includes a first data fragment of a first media data stream. The RTP extension header includes a second data fragment of a second media data stream. In an embodiment, the RTP packet is obtained through parsing a target packet. The target packet is, for example, a UDP packet.

In Operation S802, the first data fragment of the first media data stream is parsed from the RTP load of the RTP packet.

In Operation S803, the second data fragment of the second media data stream is parsed from the RTP extension header of the RTP packet. In this way, the terminal device may obtain the respective data fragments of the two media data streams from the same RTP packet. Through Operation S803, in the embodiments of the present disclosure, second data fragments may be obtained from RTP packets, and an obtained sequence from a start fragment to an end fragment may form a complete second media data stream.

Further, the terminal device may synchronously present the first data fragment and the second data fragment obtained from the same RTP packet.

In some embodiments, when the terminal device parses the RTP packet, the terminal device further parses a target field of the RTP extension header. The target field is configured for representing a position of the second data fragment in the second media data stream.

When the target field is a start field, the terminal device may determine that the second data fragment is a start fragment of the second media data stream.

When the target field is an end field, the terminal device determines that the second data fragment is an end fragment of the second media data stream. The start fragment and the end fragment are respectively configured for determining a start and an end of the second media data stream.

In some embodiments, the terminal device may perform an SDP negotiation process. For example, the terminal device may send an offer generated based on a session description protocol (SDP). The offer includes media description and extension information. The media description is configured for representing description information related to transmission of the first media data stream, and the extension information is configured for representing description information related to transmission of the second media data stream in the RTP extension header.

In addition, the terminal device may receive an answer from the server to the offer, to complete SDP negotiation with the server.

Since SDP negotiation has been performed on a functional configuration required by the original media data stream and the extended media data stream before the RTP packet is generated, the terminal device parses the RTP packet to obtain the first data fragment of the original media data stream and the second data fragment of the extended media data stream, and renders and displays according to the data fragments.

In an embodiment of the present disclosure, when the original media data stream and the extended media data stream are rendered, rendering needs to be performed according to a time correspondence between the original media data stream and the extended media data stream, so that synchronous display of the original media data stream and the extended media data stream can be ensured. The time correspondence between the original media data stream and the extended media data stream may be specifically a time point at which the extended media data stream is inserted into the original media data stream. For example, the extended media data stream is inserted at a start of a fifth minute of playing the original media data stream, and playing of the extended media data stream ends at an end of a tenth minute. In this case, during rendering, the original media data stream before the fifth minute is first rendered and displayed. At the start of the fifth minute, rendering of the extended media data stream starts, and the original media data stream within the fifth minute period and the extended media data stream within the first minute period are simultaneously displayed, until synchronous rendering and synchronous display of the original media data stream and all extended media data streams between the fifth minute and the tenth minute are completed, and finally the remaining original media data streams are rendered and displayed.

The method for transmitting a media data stream in the embodiments of the present disclosure may be applied to any scenario involving real-time audio and video communication. For example, scenarios such as interactive live streaming, e-commerce live streaming, video live streaming, video conferencing, video communication, P2P, and the like that require a low delay. In addition, the method for transmitting a media data stream in the present disclosure may also synchronize data streams that cannot be synchronized, for example, synchronizing a metadata data stream that is an extended interactive supplementary stream of the audio and video data streams. Next, a scenario in which a one-to-one class based on live streaming is taken as an example, to describe the method for transmitting a media data stream in the embodiments of the present disclosure in detail.

With the widespread popularity of live streaming, live streaming-based online classes gradually emerge, for example, a live streaming-based one-to-one class. The one-to-one class is a face-to-face session performed by a teacher and a student through live streaming. During live streaming, there are various types of data streams, such as courseware content that needs to be displayed when the teacher lectures, a subtitle corresponding to content of the teacher lectures, an answer of the student to a question asked by the teacher, and a question asked by the student. The various types of data streams are related. For example, the subtitle needs to be synchronized with what the teacher says, the courseware content needs to be synchronized with session content of the teacher, the answer of the student to the question asked by the teacher shall be immediately following the question asked by the teacher, and the question asked by the student shall fall within a question answering time range of the teacher. A delayed arrival of any one or more types of data streams affects an effect of the live streaming. Therefore, to ensure a teaching effect, it is important to ensure a low delay in the live streaming process.

During the live streaming, a data stream collected by an image collection apparatus such as a camera is the original media data stream in the present disclosure, and dynamic data streams such as a picture recording the courseware content, the subtitle, the answer of the student, and the question are the extended media data stream in the embodiments of the present disclosure. Through the method for transmitting the media data stream in the present disclosure, synchronous transmission, synchronous rendering, and synchronous display of the original media data stream and the extended media data stream that need to be synchronized can be implemented. Next, the method for transmitting the media data stream in the present disclosure is described in detail through an example in which a courseware content picture is used as the extended media data stream.

The system architecture corresponding to the one-to-one scenario includes a teacher terminal, a student terminal, and a server. The teacher terminal and the student terminal are provided with an image collection apparatus that is built-in or peripheral. The image collection apparatus may be specifically an apparatus such as a camera or a video recorder. When the teacher starts a class, a camera connected to the teacher terminal starts to capture a video to generate a live streaming data stream. As the class content progresses, a courseware content picture related to real-time lecture content needs to be displayed in an interface. Since the courseware content picture and the live streaming data stream are two data streams and are transmitted independently of each other, it needs to be ensured that when the teacher lectures the courseware content picture, the courseware content picture is also synchronously displayed in the teacher terminal and the student terminal.

During the live streaming, the server may obtain, in real time, the live streaming data stream generated by the camera, and packetize the live streaming data stream to generate a plurality of first data fragments corresponding to the live streaming data stream. After the teacher opens a courseware file stored in the teacher terminal and selects to project, the server may also receive an extended media data stream including the courseware content picture. The server may, according to a time correspondence between the courseware picture and the live streaming video, insert, at a time point when the courseware content picture needs to be displayed, a second data fragment generated by packetizing the extended media data stream, and may further set a start field and an end field that correspond to the second data fragment. The start field and the end field that correspond to the second data fragment are added to the second data fragment. Then the second data fragment may be padded into the RTP extension header. Then an RTP packet is formed according to the padded RTP extension header and the RTP load carrying the original media data stream, where the original media data stream in the RTP load exists in a form of the first data fragment. Then the RTP packet is encapsulated based on a UDP transport protocol to generate a UDP packet. Finally, the UDP packet is sent to the teacher terminal and the student terminal, so that the live streaming video stream and the courseware content picture are synchronously displayed on the teacher terminal and the student terminal.

Taking the student terminal as an example, after receiving the UDP packet, the student terminal may parse the UDP packet to obtain the RTP packet therein, and then parse the RTP packet to obtain the first data fragment corresponding to a teacher live streaming picture and the second data fragment corresponding to the courseware content. Next, the student terminal may decode the first data fragment to obtain fragments corresponding to the teacher live streaming picture from each first data fragment, and sort and splice these fragments according to a times tamp to obtain the data stream corresponding to the teacher live streaming picture. In addition, the student terminal decodes the second data fragment to obtain a fragment and a target field therein, where the target field includes the start field and the end field. Then, a target fragment corresponding to the courseware content picture may be determined according to the obtained start field and end field. Target fragments are sorted and spliced according to the timestamp to obtain a data stream corresponding to the courseware content picture. Finally, the two data streams are rendered and displayed according to a time correspondence between the courseware content picture and the teacher live streaming picture, so as to display, in a display interface, the teacher live streaming picture and the courseware content picture that need to be displayed synchronously.

As described above, the method for transmitting a media data stream in the embodiments of the present disclosure may also be applied to other scenarios. For example, in an interactive live streaming scenario, a livestreamer may interact with a viewer, and the livestreamer may interact with another livestreamer. In such a scenario, the server may obtain a media data stream corresponding to a live streaming picture of the livestreamer, and also obtain a media data stream in which the viewer of the another livestreamer interacts with the livestreamer. For example, the media data stream may be interactive text information, an interactive video, interactive audio, or the like. Then the server packetizes according to the media data stream corresponding to the live streaming picture of the livestreamer and the interactive media data stream, to form a first data fragment and a second data fragment. When the interactive media data stream is packetized to form the second data fragment, for each second data fragment, a start field corresponding to the start fragment and an end field corresponding to the end fragment are marked. The start field and the end field are added to the second data fragment. The second fragment then is padded into the RTP extension header. The RTP packet is generated according to the padded RTP extension header and an RTP load carrying the original media data stream. Finally, the RTP packet is encapsulated according to a preset transport protocol to generate a target packet, and the target packet is sent to terminal devices of all viewers and a terminal device of the livestreamer. The target packet may be, for example, a UDP packet. After receiving the target packet, the target packet may be parsed to obtain the RTP packet. The RTP packet is parsed to obtain the first data fragment and the second data fragment therein. Then the first data fragment is decoded to obtain the fragment corresponding to the live streaming picture, and the live streaming media data stream is formed according to these fragments. At the same time, the second data fragment is decoded to obtain the fragment and the target field therein. The field information includes the start field and the end field. The obtained start field and the end field determine the target fragment corresponding to the interactive media data stream, so that the interactive media data stream may be formed according to the target fragment. Finally, the live streaming media data stream and the interactive media data stream is rendered and displayed according to the time correspondence.

A method for transmitting a media data stream is provided in the present disclosure. A plurality of second data fragments corresponding to an extended media data stream are obtained. Each second data fragment is padded into an RTP extension header, and an RTP packet is formed according to the padded RTP extension header and an RTP load carrying an original media data stream. Finally, the RTP packet is sent to a terminal device. A method for transmitting a media data stream is provided in the embodiments of the present disclosure. On one hand, one RTP media data stream can be multiplexed, two different media data streams are carried in the same RTP packet, which avoids creating a media data stream protocol stack for different media data streams, and avoids performing session description protocol-based negotiation, thereby simplifying a transmission operation of the media data stream and improving transmission efficiency. On the other hand, the method for transmitting the media data stream in the embodiments of the present disclosure only needs to perform RTP header extension customization at an RTP service sending layer and perform corresponding parsing and assembly at an RTP service receiving layer, so that a synchronous transmission of a dynamic data stream can be implemented. The transmission method is simple, and is compatible with the WebRTC standard, and a media data stream can be dynamically and flexibly added. In addition, transmission synchronization of two media data streams can be achieved, and asynchronization between different media data streams is avoided.

Although the various operations of the method in the present disclosure are described in a specific order in the accompanying drawings, this does not require or imply that the operations are bound to be performed in the specific order, or all the operations shown are bound to be performed to achieve the expected result. Additionally or alternatively, some operations may be omitted, a plurality of operations may be combined into one operation for execution, and/or one operation may be decomposed into a plurality of operations for execution, and the like.

Figure 9:
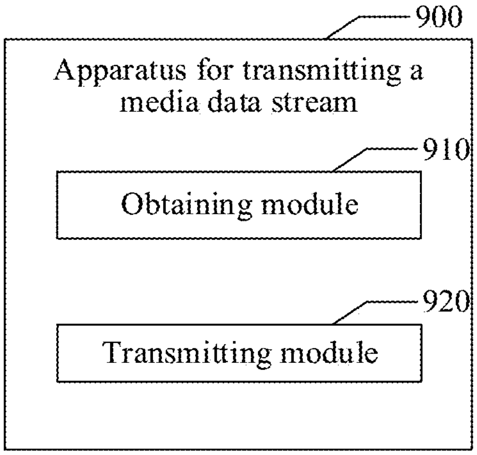
FIG. 9 shows a structural block diagram of an exemplary apparatus for transmitting a media data stream according to an embodiment of the present disclosure.

The following describes apparatus embodiments of the present disclosure, and the apparatus embodiments may be configured for performing the method for transmitting a media data stream in the foregoing embodiment of the present disclosure. FIG. 9 shows a structural block diagram of an apparatus for transmitting a media data stream according to an embodiment of the present disclosure. As shown in FIG. 9, an apparatus 900 may include: an obtaining module 910 and a transmitting module 920. Specifically, the obtaining module 910 is configured to obtain a first data fragment from a first media data stream as an RTP load; and obtain a second data fragment from a second media data stream; and the transmitting module 920 is configured to add the second data fragment into an RTP extension header; and generate an RTP packet including the RTP extension header and the RTP load.

In addition, the transmitting module 920 is further configured to transmit the RTP packet to a terminal device.

The specific details of the apparatus provided in the foregoing embodiments of the present disclosure are described in detail in the corresponding method embodiments, and are not described herein again.

Figure 10:
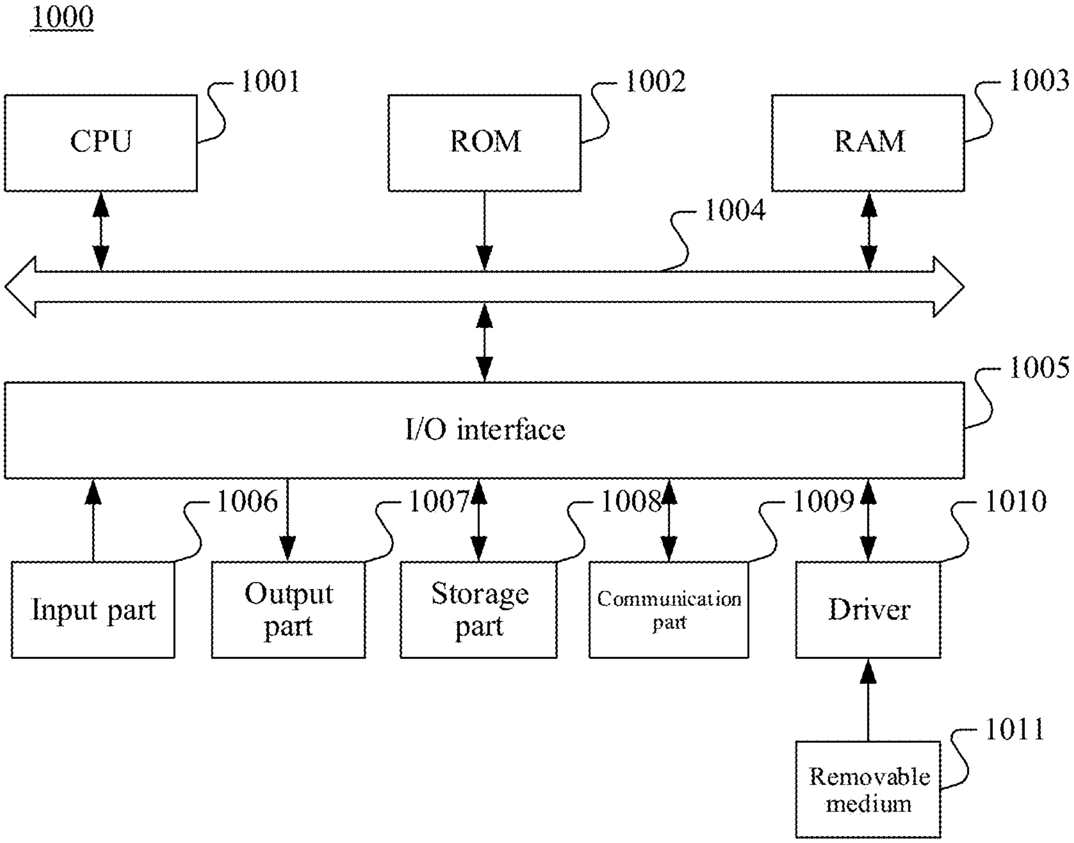
FIG. 10 shows a structural block diagram of an exemplary computer system adapted to implement an electronic device according to an embodiment of the present disclosure.

FIG. 10 shows a structural block diagram of a computer system adapted to implement an electronic device according to an embodiment of the present disclosure. The electronic device may be a terminal device 101 and a server 102 shown in FIG. 1.

A computer system 1000 of the electronic device shown in FIG. 10 is merely an example, and does not constitute any limitation on functions and use ranges of the embodiments of the present disclosure.

As shown in FIG. 10, the computer system 1000 includes a central processing unit (CPU) 1001, which may perform various suitable actions and processing based on a program stored in a read-only memory (ROM) 1002 or a program loaded from a storage part 1008 into a random access memory (RAM) 1003. The random access memory 1003 further stores various programs and data required for system operations. The central processing unit 1001, the read-only memory 1002, and the random access memory 1003 are connected to each other through a bus 1004. An input/output (I/O) interface 1005 is also connected to the bus 1004.

In some embodiments, the following components are connected to the input/output interface 1005: an input part 1006 including a keyboard, a mouse, or the like; an output part 1007 including a cathode ray tube (CRT), a liquid crystal display (LCD), a speaker, or the like; a storage part 1008 including a hard disk, or the like; and a communication part 1009 including a network interface card such as a local area network card or a modem. The communication part 1009 performs communication processing by using a network such as the Internet. A driver 1010 is also connected to the input/output interface 1005 as required. A removable medium 1011 such as a magnetic disk, an optical disc, a magneto-optical disk, or a semiconductor memory is mounted on the driver 1010 as required, so that a computer program read from the removable medium 1011 is installed into the storage part 1008 as required.

Particularly, according to an embodiment of the present disclosure, the processes described in method flowcharts may be implemented as computer software programs. For example, this embodiment of the present disclosure includes a computer program product, the computer program product includes a computer program carried on a computer-readable medium, and the computer program includes program code configured for performing the methods shown in the flowcharts. In such an embodiment, by using the communication part 1009, the computer program may be downloaded and installed from a network, and/or installed from the removable medium 1011. When the computer program is executed by the central processing unit 1001, the various functions defined in the system of the present disclosure are executed.

The computer-readable medium shown in the embodiments of the present disclosure may be a computer-readable signal medium or a computer-readable medium or any combination of the two. The computer-readable medium may be, for example, but is not limited to, an electric, magnetic, optical, electromagnetic, infrared, or semi-conductive system, apparatus, or component, or any combination of the above. A more specific example of the computer-readable medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable medium may be any tangible medium containing or storing a program, and the program may be used by or used in combination with an instruction execution system, an apparatus, or a device. In the present disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable medium. The computer-readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of the present disclosure. In this regard, each box in a flowchart or a block diagram may represent a module, a program fragment, or a part of code. The module, the program fragment, or the part of code includes one or more executable instructions configured for implementing designated logic functions. It is also to be noted that, in some implementations used as substitutes, functions annotated in boxes may alternatively be occur in a sequence different from that annotated in an accompanying drawing. For example, actually two boxes shown in succession may be performed basically in parallel, and sometimes the two boxes may be performed in a reverse sequence. This is determined by a related function. It is also to be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Although a plurality of modules or units of a device configured to perform actions are discussed in the foregoing detailed description, such division is not mandatory. Actually, according to the implementations of the present disclosure, the features and functions of two or more modules or units described above may be specifically implemented in one module or unit. On the contrary, the features and functions of one module or unit described above may be further divided to be embodied by a plurality of modules or units.

According to the foregoing description of the implementations, a person skilled in the art may readily understand that the exemplary implementations described herein may be implemented by using software, or may be implemented by combining software and necessary hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing an electronic device to perform the methods according to the embodiments of the present disclosure.

After considering the specification and implementing the present disclosure, a person skilled in the art can readily think of other implementations of the present disclosure. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure.

The present disclosure is not limited to the precise structures described above and shown in the accompanying drawings, and various modifications and changes can be made without departing from the scope of the present disclosure. The scope of the present disclosure is limited only by the appended claims.

What is claimed is:

1. A method for transmitting a media data stream, performed in a server, the method comprising:

obtaining a first data fragment from a first media data stream as a real-time transport protocol (RTP) load;

obtaining a second data fragment from a second media data stream;

adding the second data fragment into an RTP extension header, wherein the RTP extension header comprises an appbits field configured to represent a position of the second data fragment in the second media data stream, the position including at least one of a position of a start fragment, a position of an end fragment, or a position between the start fragment and the end fragment; and generating an RTP packet comprising the RTP extension header and the RTP load.

2. The method according to claim 1, further comprising: transmitting the RTP packet to a terminal device.

3. The method according to claim 1, further comprising:

when the second data fragment is the start fragment of the second media data stream, setting a start field representing that the second data fragment is the start fragment in the RTP extension header; and when the second data fragment is the end fragment of the second media data stream, setting an end field representing that the second data fragment is the end fragment in the RTP extension header.

4. The method according to claim 3, wherein setting the start field representing that the second data fragment is the start fragment in the RTP extension header comprises: setting the appbits field in the RTP extension header to the start field; and setting the end field representing that the second data fragment is the end fragment in the RTP extension header comprises: setting the appbits field in the RTP extension header to the end field.

5. The method according to claim 4, wherein the appbits field comprises 4 bits;

setting the appbits field in the RTP extension header to the start field comprises: setting a first bit of the appbits field to 1 and setting remaining bits to 0; and setting the appbits field in the RTP extension header to the end field comprises: setting a second bit of the appbits field to 1 and setting remaining bits to 0.

6. The method according to claim 1, further comprising:

receiving an offer generated based on a session description protocol (SDP) and transmitted by a terminal device, wherein the offer comprises media description and extension information, the media description is configured for representing description information related to transmission of the first media data stream, and the extension information is configured for representing description information related to transmission of the second media data stream in the RTP extension header;

generating an answer to the offer; and transmitting the answer to the terminal device, to complete SDP negotiation with the terminal device.

7. The method according to claim 6, wherein the extension information comprises: an extension header identifier and a uniform resource identifier (URI) configured for transmitting the second media data stream.

8. The method according to claim 1, wherein obtaining the first data fragment from the first media data stream as the RTP load comprises:

fragmenting the first media data stream to obtain a plurality of fragments, wherein each fragment is used as one first data fragment; and obtaining the second data fragment from the second media data stream comprises:

obtaining, for each first data fragment, a data fragment with a collection period the same as a collection period of the first data fragment from the second media data stream as a second data fragment.

9. An electronic device, comprising:

one or more processors; and a memory configured to store instructions that, when being executed, cause the one or more processors to perform:

obtaining a first data fragment from a first media data stream as a real-time transport protocol (RTP) load;

obtaining a second data fragment from a second media data stream;

adding the second data fragment into an RTP extension header, wherein the RTP extension header comprises an appbits field configured to represent a position of the second data fragment in the second media data stream, the position including at least one of a position of a start fragment, a position of an end fragment, or a position between the start fragment and the end fragment; and generating an RTP packet comprising the RTP extension header and the RTP load.

10. The device according to claim 9, wherein the one or more processors are further configured to perform: transmitting the RTP packet to a terminal device.

11. The device according to claim 9, wherein the one or more processors are further configured to perform:

when the second data fragment is the start fragment of the second media data stream, setting a start field representing that the second data fragment is the start fragment in the RTP extension header; and when the second data fragment is the end fragment of the second media data stream, setting an end field representing that the second data fragment is the end fragment in the RTP extension header.

12. The device according to claim 11, wherein the one or more processors are further configured to perform:

setting the appbits field in the RTP extension header to the start field; and setting the appbits field in the RTP extension header to the end field.

13. The device according to claim 12, wherein the appbits field comprises 4 bits and the one or more processors are further configured to perform:

setting a first bit of the appbits field to 1 and setting remaining bits to 0; and setting a second bit of the appbits field to 1 and setting remaining bits to 0.

14. The device according to claim 9, wherein the one or more processors are further configured to perform:

receiving an offer generated based on a session description protocol (SDP) and transmitted by a terminal device, wherein the offer comprises media description and extension information, the media description is configured for representing description information related to transmission of the first media data stream, and the extension information is configured for representing description information related to transmission of the second media data stream in the RTP extension header;

generating an answer to the offer; and transmitting the answer to the terminal device, to complete SDP negotiation with the terminal device.

15. The device according to claim 14, wherein the extension information comprises: an extension header identifier and a uniform resource identifier (URI) configured for transmitting the second media data stream.

16. The device according to claim 9, wherein the one or more processors are further configured to perform:

fragmenting the first media data stream to obtain a plurality of fragments, wherein each fragment is used as one first data fragment; and obtaining, for each first data fragment, a data fragment with a collection period the same as a collection period of the first data fragment from the second media data stream as a second data fragment.

17. A non-transitory storage medium containing instructions that, when being executed, cause at least one processor to perform:

obtaining a first data fragment from a first media data stream as a real-time transport protocol (RTP) load;

obtaining a second data fragment from a second media data stream;

adding the second data fragment into an RTP extension header, wherein the RTP extension header comprises an appbits field configured to represent a position of the second data fragment in the second media data stream, the position including at least one of a position of a start fragment, a position of an end fragment, or a position between the start fragment and the end fragment; and generating an RTP packet comprising the RTP extension header and the RTP load.

18. The storage medium according to claim 17, wherein the at least one processor is further configured to perform: transmitting the RTP packet to a terminal device.

19. The storage medium according to claim 17, wherein the at least one processor is further configured to perform:

when the second data fragment is the start fragment of the second media data stream, setting a start field representing that the second data fragment is the start fragment in the RTP extension header; and when the second data fragment is the end fragment of the second media data stream, setting an end field representing that the second data fragment is the end fragment in the RTP extension header.

20. The storage medium according to claim 17, wherein the at least one processor is further configured to perform:

receiving an offer generated based on a session description protocol (SDP) and transmitted by a terminal device, wherein the offer comprises media description and extension information, the media description is configured for representing description information related to transmission of the first media data stream, and the extension information is configured for representing description information related to transmission of the second media data stream in the RTP extension header;

generating an answer to the offer; and transmitting the answer to the terminal device, to complete SDP negotiation with the terminal device.

* * * * *